US011763179B2

(12) United States Patent
Kim et al.

(10) Patent No.: US 11,763,179 B2
(45) Date of Patent: Sep. 19, 2023

(54) APPARATUS AND METHOD FOR ABNORMAL SITUATION DETECTION (71) Applicant: ELECTRONICS AND TELECOMMUNICATIONS RESEARCH INSTITUTE, Daejeon (KR)

(72) Inventors: Myung Eun Kim, Daejeon (KR); Seonghyun Kim, Daejeon (KR); Hyunseok Kim, Daejeon (KR); Young Sung Son, Daejeon (KR); Jongkwon Son, Daejeon (KR); Soonyong Song, Daejeon (KR); Donghun Lee, Sejong-si (KR); Ingook Jang, Gwangmyeong-si (KR); Jin Chul Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 358 days.

(21) Appl. No.: 16/922,310

(22) Filed: Jul. 7, 2020

(65) Prior Publication Data
US 2021/0019640 A1 Jan. 21, 2021

(30) Foreign Application Priority Data
Jul. 19, 2019 (KR) .................. 10-2019-0087767

(51) Int. Cl.
G06Q 30/00 (2023.01)
G06N 5/04 (2023.01)
G06N 20/00 (2019.01)

(52) U.S. Cl.
CPC ............... *G06N 5/04* (2013.01); *G06N 20/00* (2019.01)

(58) Field of Classification Search
None
See application file for complete search history.

(56) References Cited

U.S. PATENT DOCUMENTS 6,850,823 B2   2/2005   Eun et al.
11,379,689 B2  7/2022   Cho et al.
(Continued)

FOREIGN PATENT DOCUMENTS

JP    5778305       9/2015
JP    2017-107416   6/2017
(Continued)

*Primary Examiner* — Matthew T Sittner
(74) *Attorney, Agent, or Firm* — KILE PARK REED & HOUTTEMAN PLLC (57) ABSTRACT

An apparatus and method for abnormal situation detection are disclosed. An abnormal situation detection apparatus can map first sensor data among sensor data transmitted from a plurality of sensors into a vector value, convert it into first situation information in the form of an image pattern, and generate a learning model using the first situation information and an abnormal situation reference range. In addition, the abnormal situation detection apparatus can convert second sensor data among sensor data transmitted from a plurality of sensors into a form that can be input to the learning model, and determine whether an abnormal situation occurs by applying the converted second data to the learning model.

11 Claims, 4 Drawing Sheets (56) References Cited

U.S. PATENT DOCUMENTS

| | | | |
|---|---|---|---|
| 2005/0248801 A1* | 11/2005 | Miyahara | H04N 1/00082 358/1.14 |
| 2013/0173218 A1 | 7/2013 | Maeda et al. | |
| 2014/0043159 A1* | 2/2014 | Inagaki | G08B 23/00 340/540 |
| 2016/0155051 A1* | 6/2016 | Miyazaki | G06N 5/02 706/46 |
| 2017/0171692 A1 | 6/2017 | Shinohara | |
| 2017/0364051 A1 | 12/2017 | Kang et al. | |
| 2018/0165597 A1* | 6/2018 | Jordan | H04L 43/08 |
| 2020/0342252 A1* | 10/2020 | Givental | G08B 29/186 |

FOREIGN PATENT DOCUMENTS

| | | |
|---|---|---|
| KR | 10-2013-0098810 | 9/2013 |
| KR | 10-2019-0027237 | 3/2019 |
| KR | 10-2019-0084460 | 7/2019 |

* cited by examiner

APPARATUS AND METHOD FOR ABNORMAL SITUATION DETECTION

CROSS-REFERENCE TO RELATED APPLICATION

This application claims priority to and the benefit of Korean Patent Application No. 10-2019-0087767 filed in the Korean Intellectual Property Office on Jul. 19, 2019, the entire contents of which are incorporated herein by reference.

BACKGROUND OF THE INVENTION (a) Field of the Invention

The present invention relates to an apparatus and method for abnormal situation detection.

(b) Description of the Related Art

Recently, large-scale Internet of Things (IoT) devices have acquired various environmental information through sensor devices in an IoT environment connected to the Internet. Research is being conducted to provide an intelligent IoT service suitable for the situation by analyzing the acquired environmental information to determine the current situation and controlling an actuator device. In order to effectively analyze data collected from the large-scale IoT device, research on edge computing, in which a network edge node such as a gateway system preprocesses the sensing data collected from the sensor device and transmits it to a cloud, is also actively being conducted. Technology that collects data from multiple IoT sensor devices and detects an abnormal situation through large-scale sensing data analysis is applied in various services, such as a fire monitoring system and a building control system.

Conventional sensing data analysis methods are mainly determined as abnormal when real-time sensing data coming from each sensor device exceeds a predetermined range predefined by the manager. Such a conventional method is used to determine whether or not a single sensor value is abnormal, and does not transmit situation information of a space in which the sensor device is located. Accordingly, the manager can analyze the correlation between the abnormal values from various types of sensors to predict the situation. Therefore, it takes a certain time to comprehensively analyze the sensing data from all sensor devices to determine the situation. However, in the case of a service in which quick response is important, such as the fire monitoring system or a process management system, it is necessary to minimize the time required to determine an abnormal situation.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide an apparatus and method for quickly detecting an abnormal situation.

According to an exemplary embodiment of the present invention, A method for detecting an abnormal situation by using sensor data transmitted from a plurality of sensors by an abnormal situation detection apparatus can be provided. The method can include collecting first data, which is sensor data corresponding to a normal range among the sensor data, receiving second data, which is an abnormal situation reference range, from a manager, converting the first data into first situation information, which is situation information in the form of an image pattern, converting the second data into second situation information, which is situation information in the form of an image pattern, and generating a learning model using the first situation information and the second situation information.

The method can further include collecting third data, which is sensor data to be used to detect an abnormal situation among the sensor data, converting the third data into a form that can be input to the learning model, and determining whether an abnormal situation occurs by applying the converted third data to the learning model.

The converting into the first situation information can include normalizing the first data and mapping it into a vector value, and then converting it into the first situation information in the form of an image pattern, and the converting into the second situation information can include normalizing the second data and mapping it into a vector value, and then converting it into the second situation information in the form of an image pattern.

The converting the third data can include normalizing the third data and mapping it into a vector value, and then converting it into situation information in the form of an image pattern.

The first data can be data collected from the plurality of sensors installed in the same space.

The method can further include transmitting a result of the determined abnormal situation to the manager.

According to another exemplary embodiment of the present invention, a method for detecting an abnormal situation by using sensor data transmitted from a plurality of sensors by an abnormal situation detection apparatus can be provided. The method can include mapping first sensor data among the sensor data into vector value and converting it into first situation information in the form of an image pattern, generating a learning model using the first situation information and an abnormal situation reference range, converting second sensor data among the sensor data into a form that can be input to the learning model, and determining whether an abnormal situation occurs by applying the converted second data to the learning model.

The first sensor data can be sensor data corresponding to a normal range, and the second sensor data can be sensor data to be used to detect an abnormal situation.

The abnormal situation reference range can be input from a manager, and the generating the learning model can include mapping the abnormal situation reference range to a vector value and converting it into second situation information in the form of an image pattern, and generating the learning model using the first situation information and the second situation information.

According to another exemplary embodiment of the present invention, an abnormal situation detection apparatus can be provided. The abnormal situation detection apparatus can include a sensor data collector configured to collect sensor data from a plurality of sensors, a training data generator configured to convert first sensor data corresponding to a normal range among the sensor data into first situation information, which is situation information in the form of an image pattern, and to convert an abnormal situation reference range received from a manager into second situation information, which is situation information in the form of an image pattern, a situation learning executor configured to generate a learning model using the first situation information and the second situation information, and a situation inference unit configured to determine whether an abnormal situation occurs by applying second sensor data to be used to detect an abnormal situation among the sensor data to the learning model.

The abnormal situation detection apparatus can further include a situation reference value pre-processor configured to generate abnormal situation data using the abnormal situation reference range, and the training data generator can convert abnormal situation data into the second situation information.

The abnormal situation detection apparatus can further include a sensor data pre-processor configured to convert the second data into a form that can be input to the learning model.

The training data generator can normalize the first sensor data, map it to a vector value, and then convert it into the first situation information in the form of an image pattern, and the training data generator can normalize the abnormal situation reference range, map it to a vector value, and then convert it into the second situation information in the form of an image pattern.

The situation inference unit can transmit a result of the determined abnormal situation to the manager.

The abnormal situation detection apparatus can be a gateway installed in an IoT environment.

According to an exemplary embodiment of the present invention, an abnormal situation can be detected more quickly by converting sensor data into situation information in the form of an image pattern to determine the abnormal situation.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" or "connected" to another element, the element may be "directly coupled" or "directly connected" to the other element, or "electrically coupled" or "electrically connected" to the other element through a third element. In addition, unless explicitly described to the contrary, the word "comprise" or "include", and variations such as "comprises", "comprising", "includes", or "including", will be understood to imply the inclusion of stated elements but not the exclusion of any other elements.

An abnormal situation detection apparatus according to an exemplary embodiment of the present invention converts multiple sensor data acquired from a plurality of sensor devices into one situation information set represented by an image pattern, and generates a plurality of such situation information sets. The abnormal situation detection apparatus detects an abnormal situation through sensor data flowing in real time after learning the plurality of generated situation information sets and generating a learning model Meanwhile, by inputting a reference range of abnormal situations necessary for situation learning by a manager, learning for various situations can be performed. The apparatus and method for detecting an abnormal situation according to an exemplary embodiment of the present invention will be described in detail below.

Figure 1:
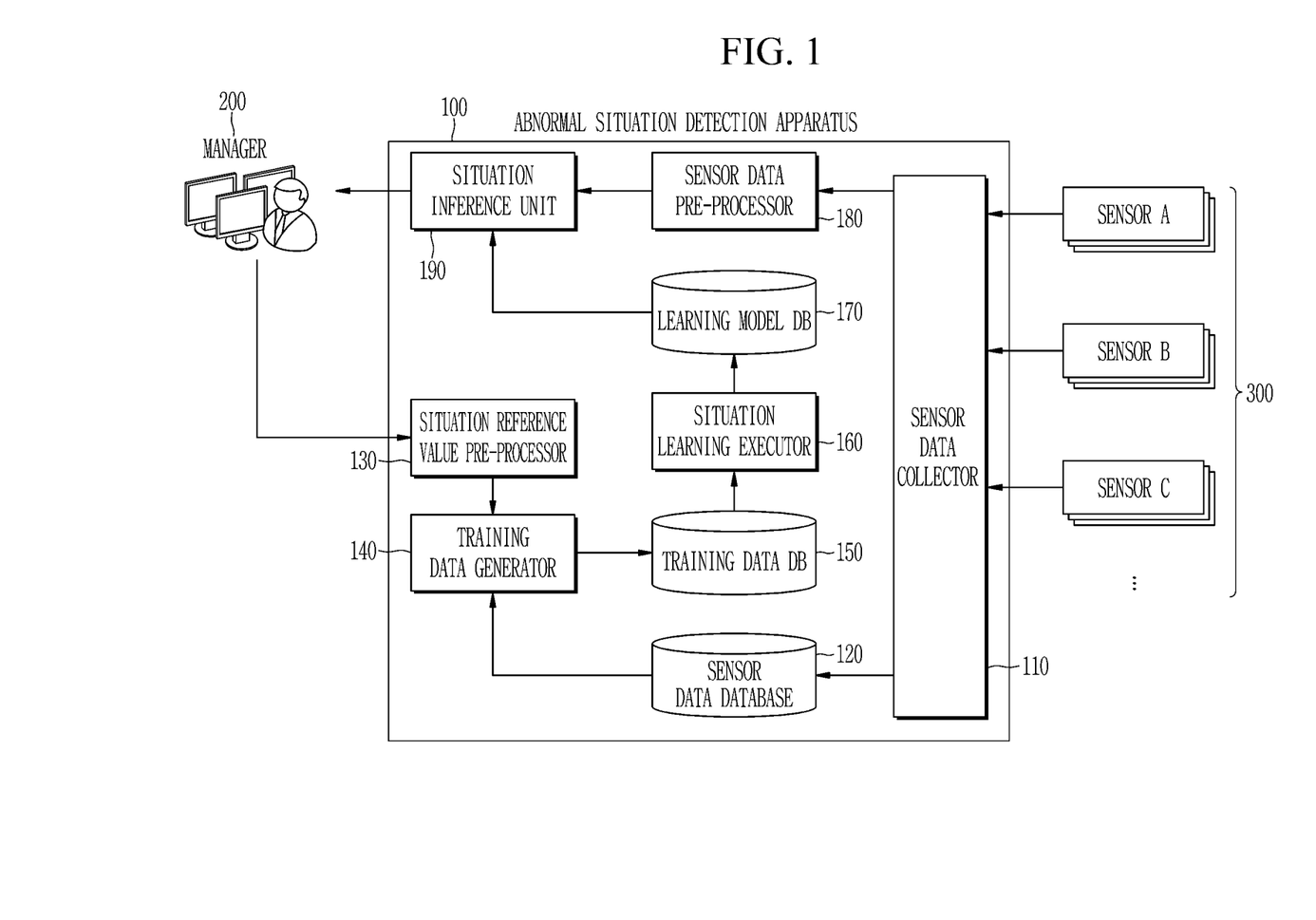
FIG. 1 is a diagram showing an abnormal situation detection apparatus according to an exemplary embodiment of the present invention.

FIG. 1 is a diagram showing an abnormal situation detection apparatus according to an exemplary embodiment of the present invention.

As shown in FIG. 1, the abnormal situation detection apparatus 100 according to an exemplary embodiment of the present invention receives sensor data from a plurality of sensors 300 in an IoT environment, receives an abnormal situation reference range from a manager 200, detects an abnormal situation, and transmits the detection result to the manager 200. The abnormal situation detection apparatus 100 can be included in an intelligent gateway installed in an IoT environment.

As shown in FIG. 1, the abnormal situation detection apparatus 100 according to an exemplary embodiment of the present invention includes a sensor data collector 110, a sensor database (DB) 120, a situation reference value pre-processor 130, a training data generator 140, a training data DB 150, a situation learning executor 160, a learning model DB 170, a sensor data pre-processor 180, and a situation inference unit 190.

The sensor data collector 110 receives and collects sensor data from a plurality of sensors 300 installed externally. The plurality of sensors 300 are installed in a predetermined place to sense sensor data, and transmit the sensed data to the abnormal situation detection apparatus 100. The sensor data collector 110 collects a plurality of sensor data sets each received from the plurality of sensors 300. Here, the sensor data can include a serial number, a sensor ID (identifier), a sensor type, a data (value), and a data creation date and time.

The sensor database 120 stores sensor data collected by the sensor data collector 110. Here, the sensor data stored in the sensor database 120 is sensor data in a normal range flowing from the plurality of sensors 300 in real time.

Meanwhile, basic data such as location information of the plurality of sensors 300 can be stored in a separate database (not shown) when the sensor device is installed.

The situation reference value pre-processor 130 receives an abnormal situation reference range from the manager 200, and dynamically generates abnormal situation data using the received abnormal situation reference range. The situation reference value pre-processor 130 randomly generates abnormal situation data within the received abnormal situation reference range, and transmits the generated abnormal situation data to the training data generator 140. That is, the abnormal situation data are randomly generated within the abnormal situation reference range received from the manager 200. For example, in the case of an indoor temperature, when the abnormal situation reference range is 28 degrees~35 degrees, the abnormal situation data for the indoor temperature can be randomly generated with values within the range (29 degrees, 30 degrees, 31 degrees, etc.).

The training data generator 140 generates training data by normalizing the sensor data stored in the sensor database 120, mapping it into a vector value, and converting it into situation information in the form of an image pattern. In addition, the training data generator 140 generates training data by normalizing the abnormal situation data received from the situation reference value pre-processor 130, mapping it into a vector value, and converting it into situation information in the form of an image pattern. The training data thus generated is stored in the training data database (DB) 150.

Figure 2:
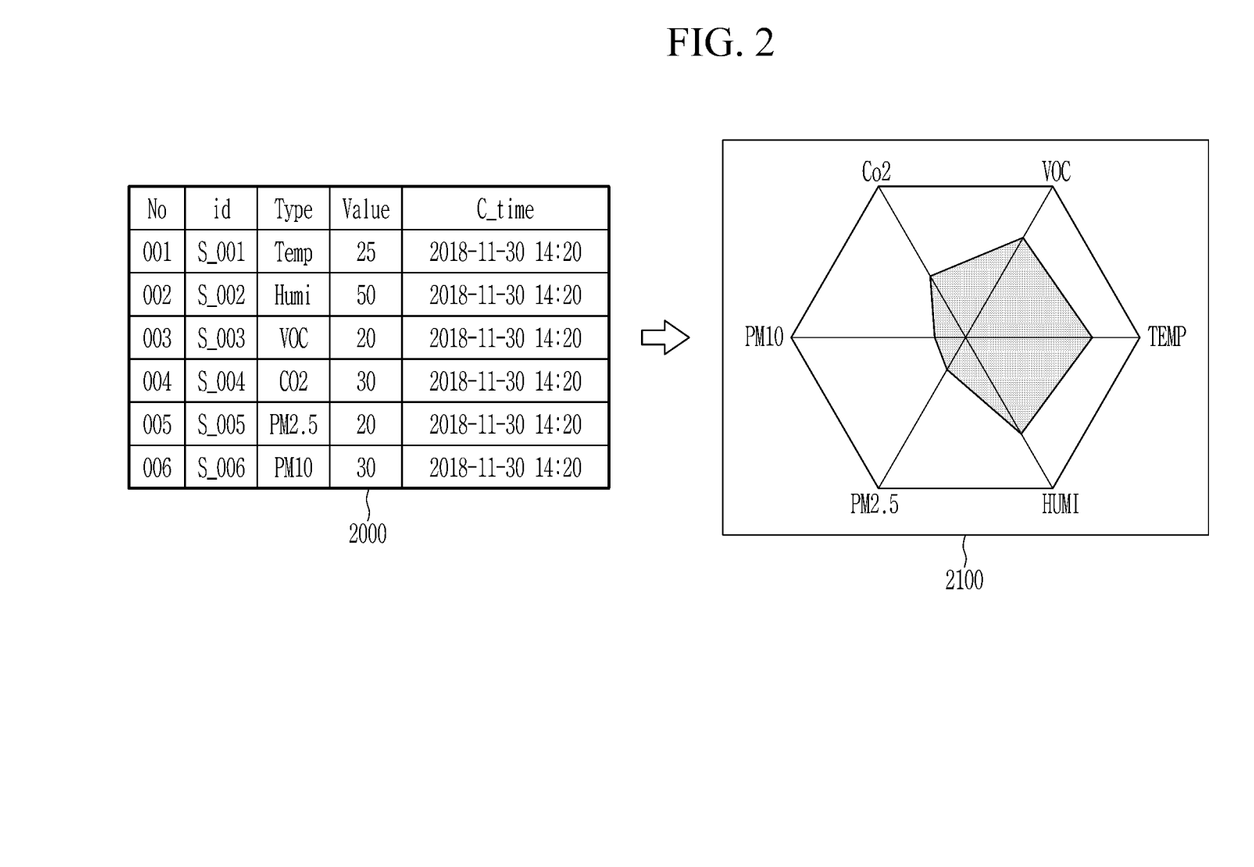
FIG. 2 is a diagram showing training data in the form of an image pattern according to an exemplary embodiment of the present invention.

FIG. 2 is a diagram showing training data in the form of an image pattern according to an exemplary embodiment of the present invention.

In FIG. 2, 2000 represents the plurality of sensor data, and 2100 represents the situation information (data) in the form of an image pattern. As shown in FIG. 2, the sensor data include a serial number (No), a sensor identifier (id), a sensing type (Type), data (Value), and a creation date and time (C_time). In the sensing type of FIG. 2, VOC (Volatile Organic Compound) represents an organic compound, PM10 (Particle Matter 10) represents a fine dust measurement unit, and PM2.5 represents an ultrafine dust measurement unit. The training data generator 140 searches various sensor data collected at the same time from sensors (sensor devices) installed in the same space in the sensor database 120. The training data generator 140 normalizes each searched sensor data set, maps it to coordinate values in the same vector space, and converts it into situation information 2100 in the form of an image pattern to generate training data. As shown in 2100 of FIG. 2, the training data according to an exemplary embodiment of the present invention can be situation information in the form of an image pattern such as a radar chart. In addition, as the situation information in the form of an image pattern, a graph (for example, a bar graph, a circle graph, etc.) that can display various types of sensor values as a graph can be used as well as the radar chart.

The training data database 150 stores the training data (the training data in the form of image patterns generated from sensor data and the training data in the form of image patterns generated from abnormal situation data) generated by the training data generator 140 as described above.

The situation learning executor 160 learns a situation using the training data stored in the training data database 150. That is, when the training data generated through the sensor data of the normal range flowing in real time and the training data generated through the abnormal situation data input (received) by the manager 200 are prepared, the situation learning executor 160 uses the training data to perform situation learning based on a CNN (Convolution Neural Network) and generates a learning model through this. The CNN-based learning method performed by the situation learning executor 160 is known to those of ordinary skill in the art to which the present invention pertains, and a detailed description thereof will be omitted.

The learning model database 170 stores the learning model generated by the situation learning executor 160.

The sensor data pre-processor 180 converts a plurality of sensor data to be used to detect an abnormal situation into a form that can be input into a learning model. The sensor data collector 110 collects sensor data corresponding to the same time zone from a plurality of sensors 300 installed in the same space. The sensor data pre-processor 180 normalizes the sensor data collected by the sensor data collector 110, and maps it to coordinate values in the same vector space and converts it into situation information in the form of an image pattern. The sensor data pre-processor 180 transmits situation information in the form of an image pattern to the situation inference unit 190.

The situation inference unit 190 loads (downloads) the learning model stored in the learning model database 170 and applies sensor data received from the sensor data pre-processor 180 to the learning model to determine whether the situation is abnormal. In addition, when it is determined that the situation is abnormal, the situation inference unit 190 transmits the abnormal situation to the manager 200. In other words, the situation inference unit 190 loads (downloads) the learning model stored in the learning model database 170 and inputs the situation information in the form of an image pattern received from the sensor data pre-processor 180 into the learning model. Then, it is determined whether or not the situation is abnormal. The situation inference unit 190 transmits the result of the determined abnormal situation to the manager 200.

Figure 3:
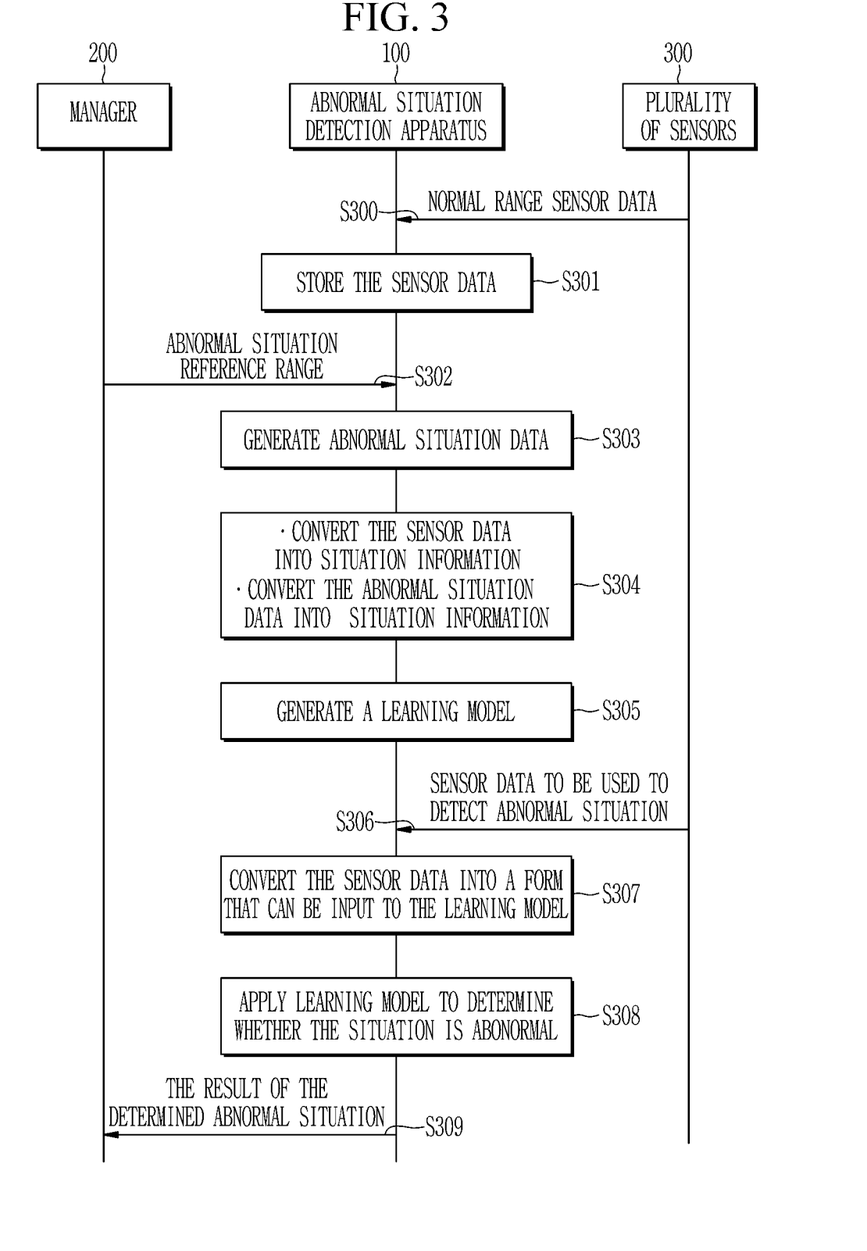
FIG. 3 is a flowchart showing a method for detecting an abnormal situation according to an exemplary embodiment of the present invention.

FIG. 3 is a flowchart showing a method for detecting an abnormal situation according to an exemplary embodiment of the present invention.

The abnormal situation detection apparatus 100 receives and collects sensor data from the plurality of sensors 300 (S300). Here, the sensor data transmitted from the plurality of sensors 300 is normal range sensor data, and the sensor data collector 110 of the abnormal situation detection apparatus 100 collects the normal range sensor data.

The abnormal situation detection apparatus 100 stores the sensor data collected in step S300 in the sensor database 120 (S301).

The abnormal situation detection apparatus 100 receives an abnormal situation reference range from the manager 200 (S302), and dynamically generates abnormal situation data using the received abnormal situation reference range (S303). That is, the situation reference value pre-processor 130 of the abnormal situation detection apparatus 100 randomly generates abnormal situation data within the received abnormal situation reference range.

The abnormal situation detection apparatus 100 converts the sensor data stored in step S301 into situation information in the form of an image pattern, and converts the abnormal situation data generated in step S303 into situation information in the form of an image pattern (S304). That is, the training data generator 140 of the abnormal situation detection apparatus 100 generates training data by normalizing the sensor data stored in the sensor database 120, mapping it into a vector value, and converting it into situation information (2100 of FIG. 2) in the form of an image pattern. In addition, the training data generator 140 of the abnormal situation detection apparatus 100 generates training data by normalizing the abnormal situation data, mapping it into a vector value, and converting it into situation information in the form of an image pattern.

The abnormal situation detection apparatus 100 generates a learning model using the training data generated in step S304 (S305). The situation learning executor 160 of the abnormal situation detection apparatus 100 generates a learning model by performing situation learning based on a CNN (Convolution Neural Network) using training data (training data in the form of image patterns generated from sensor data, and training data in the form of image patterns generated from abnormal situation data).

The abnormal situation detection apparatus 100 receives and collects sensor data to be used to detect an abnormal situation from the plurality of sensors 300 (S306). The sensor data collector 110 of the abnormal situation detection apparatus 100 collects sensor data corresponding to the same time zone from the plurality of sensors 300 installed in the same space.

The abnormal situation detection apparatus 100 converts the sensor data collected in step S306 into a form that can be input to the learning model (S307). That is, the sensor data pre-processor 180 of the abnormal situation detection apparatus 100 normalizes the sensor data collected in step S306, maps it to coordinate values in the same vector space, and converts it into situation information in the form of an image pattern.

The abnormal situation detection apparatus 100 applies the learning model to the sensor data (situation information in the form of an image pattern) converted in step S307 to determine whether the situation is abnormal (S308). That is, the situation inference unit 190 of the abnormal situation detecting apparatus 100 loads (downloads) the learning model generated in step S305, and applies the sensor data converted in step S308 to the learning model to determine whether the situation is abnormal.

The abnormal situation detection apparatus 100 transmits the result of the determined abnormal situation in step S308 to the manager 200 (S309).

The abnormal situation detection apparatus according to an exemplary embodiment of the present invention maps sensor data collected from a plurality of (multiple) sensors to coordinate values of one vector space and converts them into situation information in the form of an image pattern. Accordingly, the abnormal situation detection apparatus according to an exemplary embodiment of the present invention can consider the association between sensor data, and can detect an abnormal situation more quickly through CNN-based situation learning. When the abnormal situation detection apparatus according to an exemplary embodiment of the present invention is applied to a fire detection service or a process management service requiring real-time response, it is possible to provide a fast and accurate situation analysis result.

Figure 4:
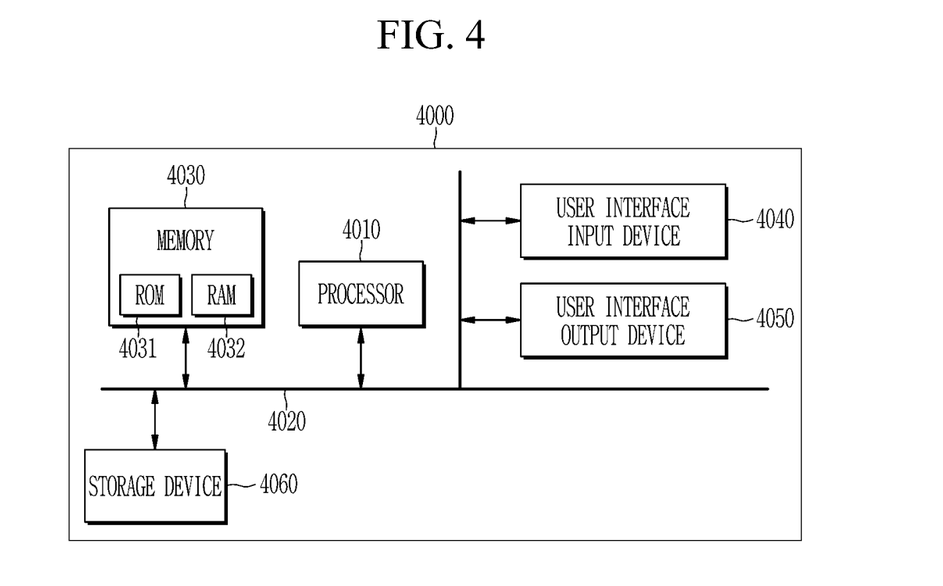
FIG. 4 is a diagram showing a computer system according to an exemplary embodiment of the present invention.

FIG. 4 is a diagram showing a computer system 4000 according to an exemplary embodiment of the present invention.

The abnormal situation detection apparatus 100 according to the exemplary embodiment of the present invention can be implemented in the computer system 4000 of FIG. 4. Each component of abnormal situation detection apparatus 100 can also be implemented in the computer system 400 of FIG. 4.

The computer system 4000 can include at least one of a processor 4010, a memory 4030, a user interface input device 4040, a user interface output device 4050, and a storage device 4060, that communicate via a bus 4020.

The processor 4010 can be a central processing (CPU) or a semiconductor device that executes instructions stored in the memory 4030 or the storage device 4060. The processor 4010 can be configured to implement the functions and methods described in FIG. 1 to FIG. 3.

The memory 4030 and the storage device 4060 can include various forms of volatile or non-volatile storage media. For example, the memory 4030 can include a read only memory (ROM) 4031 or a random access memory (RAM) 4032. In an exemplary embodiment of the present invention, the memory 4030 may be located inside or outside the processor 4010, and the memory 4030 can be coupled to the processor 4010 through various already-known means.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for detecting an abnormal situation by using sensor data transmitted from a plurality of sensors by an abnormal situation detection apparatus, the method comprising:

provided the plurality of sensors;

providing a computer system that includes a processor, memory, and at least one interface; and using a computer system for:

collecting first data using at least one of the plurality of sensors, the first data being sensor data corresponding to a normal range among the sensor data;

receiving second data, which is an abnormal situation reference range, from a manager;

converting the first data into first situation information, which is situation information in the form of an image pattern;

converting the second data into second situation information, which is situation information in the form of an image pattern;

generating a learning model using the first situation information and the second situation information; and applying the learning model to a real-time service, wherein the converting the first data into the first situation information comprises normalizing the first data and mapping it into a vector value, and then converting it into the first situation information in the form of an image pattern; and the converting the second data into the second situation information comprises normalizing the second data and mapping it into a vector value, and then converting it into the second situation information in the form of an image pattern.

2. The method of claim 1, wherein computer system is further used for:

collecting third data, which is sensor data to be used to detect an abnormal situation among the sensor data;

converting the third data into a form that can be input to the learning model; and determining whether an abnormal situation occurs by applying the converted third data to the learning model.

3. The method of claim 2, wherein the converting the third data comprises normalizing the third data and mapping it into a vector value, and then converting it into situation information in the form of an image pattern.

4. The method of claim 1, wherein the first data is data collected from the plurality of sensors installed in the same space.

5. The method of claim 2, wherein computer system is further used for:

transmitting a result of the determined abnormal situation to the manager.

6. The method of claim 1, wherein the real-time service is at least one of a fire detection service and a process management service.

7. An abnormal situation detection apparatus, comprising:

a plurality of sensors;

a sensor data collector configured to collect sensor data from the plurality of sensors; and a computer system that includes a processor, memory, and at least one interface, the computer system being configured to convert first sensor data corresponding to a normal range among the sensor data into first situation information, which is situation information in the form of an image pattern, and to convert an abnormal situation reference range received from a manager into second situation information, which is situation information in the form of an image pattern;

generate a learning model using the first situation information and the second situation information;

determine whether an abnormal situation occurs by applying second sensor data to be used to detect an abnormal situation among the sensor data to the learning model; and apply the learning model to a real-time service, wherein the computer system normalizes the first sensor data, maps it to a vector value, and then converts it into the first situation information in the form of an image pattern, and the computer system normalizes the abnormal situation reference range, maps it to a vector value, and then converts it into the second situation in information in the form of an image pattern.

8. The abnormal situation detection apparatus of claim 7, further comprising a situation reference value pre-processor configured to generate abnormal situation data using the abnormal situation reference range, wherein the computer system converts abnormal situation data into the second situation information.

9. The abnormal situation detection apparatus of claim 7, further comprising a sensor data pre-processor configured to convert the second data into a form that can be input to the learning model.

10. The abnormal situation detection apparatus of claim 7, wherein the computer system transmits a result of the determined abnormal situation to the manager.

11. The abnormal situation detection apparatus of claim 7, wherein the computer system includes a gateway installed in an IoT environment.

* * * * *